(12) United States Patent
Aoki

(10) Patent No.: US 8,235,446 B2
(45) Date of Patent: Aug. 7, 2012

(54) FOLDING VEHICLE SEAT

(75) Inventor: Kazuya Aoki, Takanezawa-machi (JP)

(73) Assignee: TS TECH Co., Ltd., Asaka-Shi, Saitama (JP)

( * ) Notice: Subject to any disclaimer, the term of this patent is extended or adjusted under 35 U.S.C. 154(b) by 153 days.

(21) Appl. No.: 12/878,328

(22) Filed: Sep. 9, 2010

(65) Prior Publication Data

US 2011/0057470 A1 Mar. 10, 2011

(30) Foreign Application Priority Data

Sep. 9, 2009 (JP) ................................. 2009-207922

(51) Int. Cl.
*B60N 2/30* (2006.01)
(52) U.S. Cl. ....... 296/65.09; 296/66; 297/15; 248/503.1
(58) Field of Classification Search ............... 296/65.01, 296/68.1, 65.03, 65.05, 65.09, 65.16, 66; 297/3, 15, 331, 335, 340; 248/503.1; *B60N 2/30*
See application file for complete search history.

(56) References Cited

FOREIGN PATENT DOCUMENTS

| JP | 3-84240 | | 8/1991 |
|----|---------|---|--------|
| JP | 2007055421 A | * | 3/2007 |

* cited by examiner

*Primary Examiner* — Dennis Pedder
*Assistant Examiner* — Jason S Daniels
(74) *Attorney, Agent, or Firm* — Shoemaker and Mattare

(57) ABSTRACT

A folding vehicle seat is adapted to be stored on a first portion of a vehicle body floor and retained on the first portion by a retaining belt arrangement which includes a belt attached at its lower end to a vertical wall extending upward from the floor and a hook attached to an upper end of the belt. The upper end is inserted through a ring attached to the wall. The seat includes a seat cushion pivotally supported on a second portion of the floor and a seat back pivotally supported by the cushion, the cushion and back being adapted to be put together as a single body which is adapted to be pivoted from the second portion toward the first portion and has an engagement mechanism with which the hook is adapted to be engaged at the time when the body is stored on the first portion.

12 Claims, 4 Drawing Sheets

FOLDING VEHICLE SEAT

CROSS REFERENCE TO RELATED APPLICATION

The present application claims the benefit of priority of Japanese Patent Application No. 2009-207922 filed on Sep. 9, 2009, the entire content of which is incorporated herein by reference.

FIELD OF THE INVENTION

The present invention relates to a folding vehicle seat which includes a seat cushion pivotally supported on a vehicle body floor and a seat back pivotally supported by the seat cushion and in which the seat back is pivoted and folded relative to the seat cushion, whereby they are put together as a single seat body, and the seat body comprising the seat cushion and the seat back is pivoted and then carried on the vehicle body floor for the purpose of storage.

BACKGROUND OF THE INVENTION

As a rear seat for a vehicle, there has been proposed a vehicle seat which includes a seat cushion arranged on a predetermined portion of a vehicle body floor and a seat back pivotally supported by the seat cushion and in which the seat back is pivoted and folded relative to the seat cushion, whereby they are put together as a single seat body, and the seat body comprising the seat cushion and the seat back is removed from the predetermined portion of the vehicle body floor and then stored in a space adjacent a side body of the vehicle so as to stand up from the vehicle body floor.

The rear seat is provided with a retaining belt for retaining the seat. The retaining belt is attached at a lower end portion thereof to a bottom portion of the seat cushion and has a hook provided at an upper end portion of the retaining belt. When the seat body comprising the seat cushion and the seat back is stored in the space adjacent the side body of the vehicle, the hook of the retaining belt is adapted to be entrapped in a stopper ring provided at an upper portion of the side body, whereby the seat body is retained by the retaining belt so as not to fall down on the vehicle body floor (Japanese Utility Model Unexamined Application No. Hei 3-84240).

In addition to the rear seat discussed above, there has been also proposed a seat for a vehicle which is arranged on a vehicle body floor having upper and lower step portions. The vehicle seat includes a seat cushion pivotally supported by the upper step portion of the vehicle body floor and a seat back pivotally supported by the seat cushion. The seat back is pivoted and folded relative to the seat cushion, whereby they are put together as a single seat body. The seat body comprising the seat cushion and the seat back is pivoted in such a manner that one of the seat back and seat cushion is overlapped or carried on the other of the seat cushion and seat back and positioned in an upward position, and then carried on the lower step portion of the vehicle body floor for the purpose of storage.

This vehicle seat is adapted to be retained on the lower step portion of the vehicle body floor by causing the other of the seat cushion and seat back of the seat body in the stored state to be stoppingly engaged with a lock fitting mounted on the lower step portion of the vehicle body floor.

In the vehicle seat, when the vehicle is subjected to vibration during travel of the vehicle, the vibration is applied directly to the vehicle seat in the stored state to thereby cause the one of the seat cushion and seat back to be jumped up. When the one of the seat cushion and seat back is jumped up, foreign sound is easy to be produced. Moreover, by the vibration which is applied to the vehicle seat, foreign sound is easy to be also produced from the interior of the vehicle seat. In addition, there are variation in the installation of the lock fitting with respect to the lower step portion of the vehicle body floor and variation in a surface of the lower step portion of the vehicle body floor, so that accuracy of the installation of the lock fitting and accuracy of engagement between the lock fitting and the other of the seat cushion and seat back are required to be improved.

SUMMARY OF THE INVENTION

The present invention has been made with a view to overcoming the foregoing problems of the related art.

It is a main object of this invention to provide a folding vehicle seat which can be stably stored on a vehicle body floor and in which foreign sound is prevented from being produced by vibration which is applied to a vehicle during travel of the vehicle and then transmitted to the vehicle seat, and a degree of freedom in design is increased.

In accordance with the present invention, there is provided a folding vehicle seat adapted to be stored on a first portion of a vehicle body floor and retained on the first portion of the vehicle body floor by a retaining belt arrangement. The folding vehicle seat comprises a seat cushion pivotally supported on a second portion of the vehicle body floor, and a seat back pivotally supported by the seat cushion. The seat cushion and the seat back are adapted to be put together as a single seat body. The single seat body is adapted to be pivoted from the second portion of the vehicle body floor toward the first portion of the vehicle body floor and then stored on the first portion of the vehicle body floor. The single seat body has an engagement means provided at one of the seat cushion and seat back which is positioned in an upward position when the single seat body is pivoted and stored on the first portion of the vehicle body floor. The vehicle body floor has a vertical wall extending upward from the first portion of the vehicle body floor and a ring member mounted on a top surface of the vertical wall for supporting the retaining belt arrangement. The retaining belt arrangement comprises a belt body attached at a lower end portion thereof to a lower portion of the vertical wall of the vehicle body floor, and a hook member having a hooking portion and attached to an upper end portion of the belt body with the hooking portion facing in the direction in which the seat body is pivoted for storage. The upper end portion of the belt body is inserted through the ring member. The hooking portion of the hook member is engaged with the engagement means of the seat body in the stored state, whereby the vehicle seat is retained on the first portion of the vehicle body floor.

In the folding vehicle seat, the hooking portion of the hook member of the retaining belt arrangement is engaged with the engagement means of the seat body in the stored state, so that even if the vehicle is subjected to vibration during travel of the vehicle and the vibration is transmitted to the vehicle seat, by the engagement between the hooking portion of the hook member of the retaining belt arrangement and the engagement means, both the seat cushion 1a and the seat back 1b are positively prevented from being jumped up according to the application of the vibration and, thus, any foreign sound are not produced. Moreover, deflection of the belt body can be positively prevented by the ring member.

Moreover, the retaining belt arrangement is arranged such that the lower end portion of the belt body is attached to the lower portion of the vertical wall of the vehicle body floor and the upper end portion of the belt body is inserted through the ring member, so that accuracy of installation of the retaining belt arrangement is not required. In addition, it is unnecessary to provide an obstacle such as the lock fitting (employed in the related art) on the surface of the vehicle body floor.

Moreover, the engagement means with which the hooking portion of the hook member is adapted to be engaged is provided at the one of the seat cushion and seat back which is positioned in an upward position when they are put together into the single seat body and the seat body is pivoted for storage. The engagement means may be provided at a front portion of the one of the seat cushion and seat back or side portion adjacent the front portion of the one of the seat cushion and seat back in the direction in which the seat body is pivoted for storage, so that a degree of freedom in design is increased.

The retaining belt arrangement may be configured so as to retain the seat body on the portion of the vehicle body floor from a front side in the direction in which the seat body is pivoted for storage. In this case, the seat body can be most stably retained on the portion of the vehicle body floor.

The ring member may include a portion on which the hooking portion of the hook member is adapted to be hooked. In this case, by causing the hooking portion of the hook member to be hooked on the portion of the ring member at the time of none-use of the retaining belt arrangement, the retaining belt arrangement can be arranged so as to extend along the vertical wall and hang down from the ring member.

The retaining belt arrangement may include a spring provided between the upper and lower end portions of the belt body, the spring having a length shorter than that of the belt body. In this case, when the vehicle is subjected to the vibration during the travel of the vehicle and the vibration is transmitted to the seat body, the spring allows the belt body to be expanded and contracted, according to the application of the vibration. Therefore, the hooking portion of the hook member in use of the retaining belt arrangement is positively prevented from being disengaged from the engagement means. Moreover, in the state where the hooking portion of the hook member is hooked on the portion of the ring member at the time of none-use of the retaining belt arrangement, the belt body is flexed toward the vertical wall by the difference between the length of the spring and the length of the belt body and, thus, a length of the belt body which is measured on a plane is shortened, so that the hooking portion of the hook member can be prevented from being disengaged from the portion of the ring member even if the hooking portion of the hook member is loosely hooked on the portion of the ring member.

The retaining belt arrangement may include a handle strap extending upward from the hook member. In this case, engagement of the hooking portion of the hook member with the engagement means and disengagement of the hooking portion of the hook member from the engagement means can be easily carried out by handling the handle strap.

BRIEF DESCRIPTION OF THE DRAWINGS

The foregoing summary and the following detailed description of a preferred embodiment of the present invention will be best understood when read in conjunction with the appended drawings, in which.

DETAILED DESCRIPTION OF THE INVENTION

Figure 1:
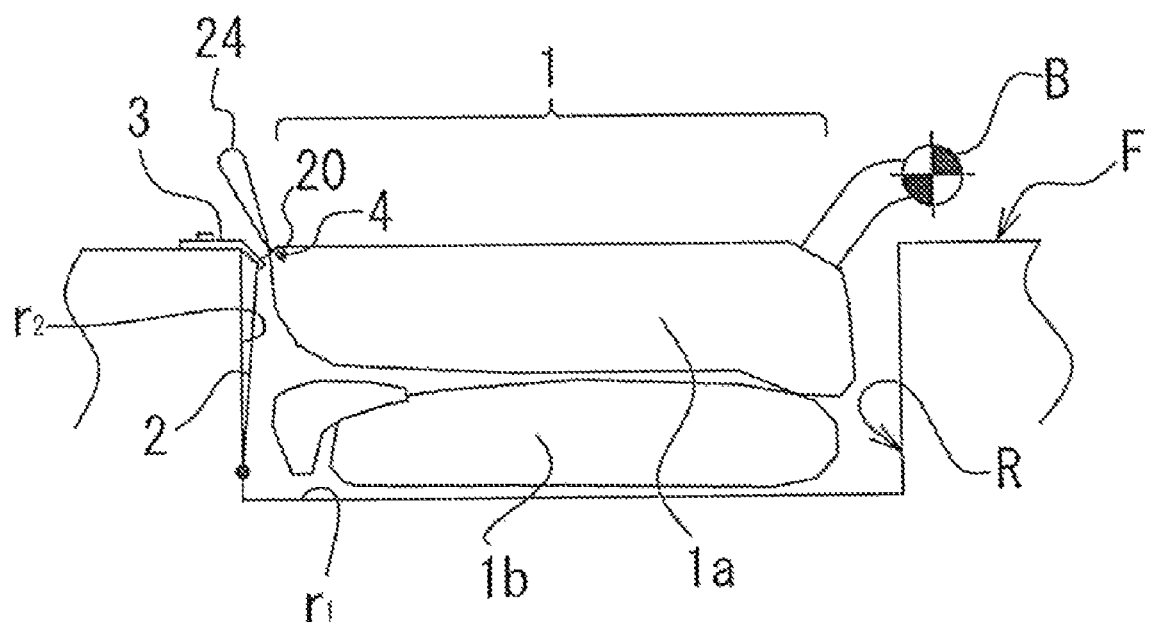
FIG. 1 is a schematic view of a folding vehicle seat according to the preferred embodiment of the present invention, which is of assistance in explaining a state where a single seat body into which a seat back of and a seat cushion of the vehicle seat have been put together is stored on a vehicle body floor.

An illustrated embodiment according to the present invention is a vehicle rear seat for several persons. Referring now to FIG. 1, the rear seat includes a seat cushion 1a and a seat back 1b. A pair of spaced apart base brackets (not shown) is installed on a vehicle body floor F. The seat cushion 1a is disposed between the base brackets and pivotally supported through an axis B on the base brackets so as to be pivotable around the axis B. The seat back 1b is pivotably supported through recliner means (not shown) by the seat cushion 1a. The seat back 1b is pivoted relative to the seat cushion 1a so as to be overlapped or carried on the seat cushion 1a, whereby the seat back 1b and the seat cushion 1a are put together into a single seat body 1. By causing the seat body 1 to be pivoted rearward about the axis B in such a manner that the seat cushion 1a is carried or overlapped on the seat back 1b and is positioned in an upward position, the seat body 1 is stored within a recess portion R formed in the vehicle body floor F.

The vehicle seat is adapted to be retained with respect to a bottom surface r1 of the recess portion R by a retaining belt arrangement 2.

Figure 2:
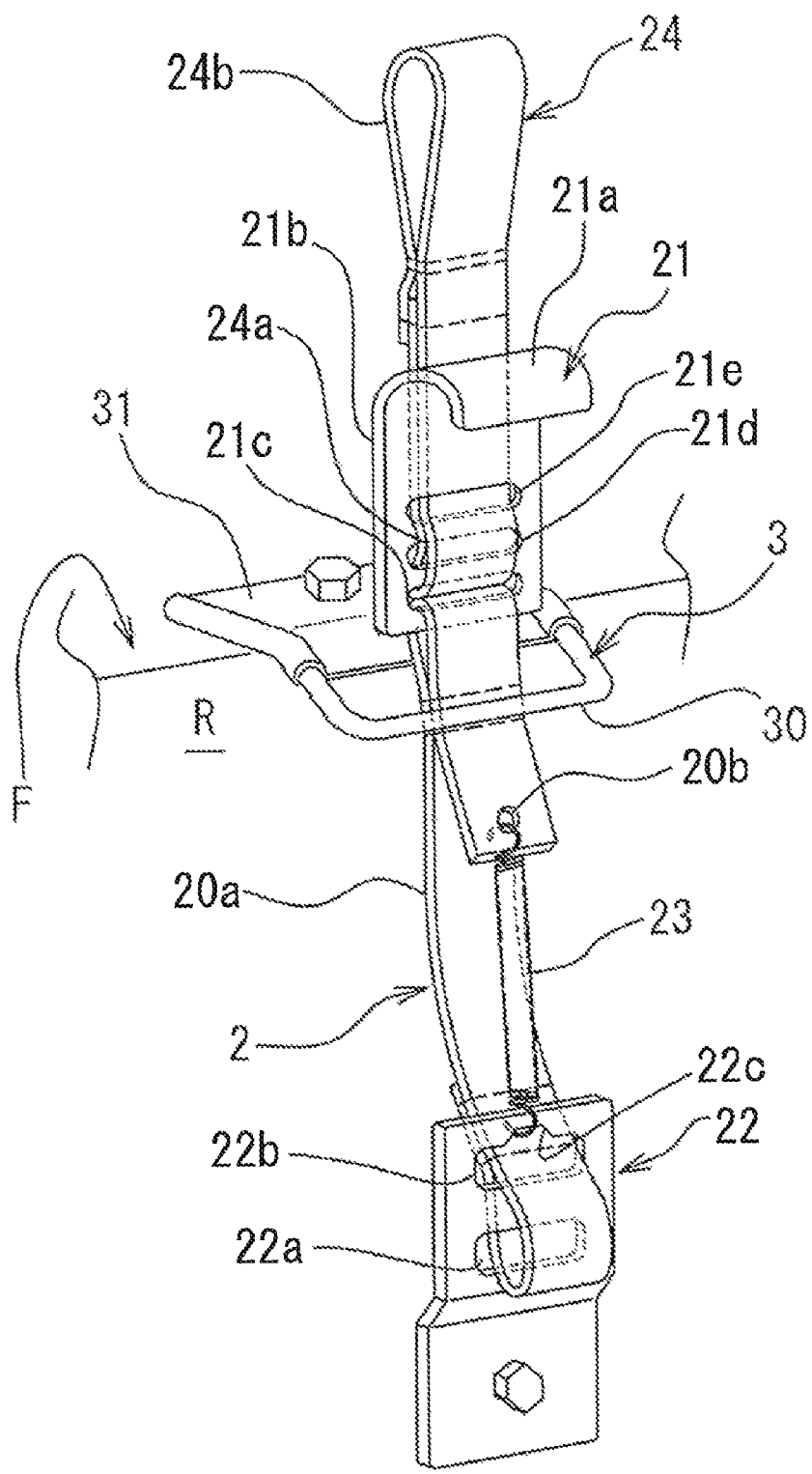
FIG. 2 is a perspective view of a retaining belt arrangement for retaining the vehicle seat on the vehicle body floor.

Referring now to FIG. 2, there is illustrated the retaining belt arrangement 2. The retaining belt arrangement 2 includes a belt body 20a, a hook member 21, a fixing bracket 22, and a handle strap 24. The hook member 21 is formed into substantially an inverted J-shape as viewed from a side and includes a hook base portion 21b and a hooking portion 21a extending continuously from the hook base portion 21b. The hook member 21 is attached to an upper end portion of the belt body 20a with the hooking portion 21a thereof facing in the direction in which the seat body 1 is pivoted for storage. The fixing bracket 22 is attached to a lower end portion of the belt body 20a and bolt-fastened onto a lower portion of a vertical wall r2 (FIG. 1) of the recess portion R.

The hook member 21 has lower, middle, and upper slits 21c, 21d, 21e which are formed in the hook base portion 21b of the hook member 21 so as to vertically spaced apart from one another. The fixing bracket 22 is also formed with lower and upper slits 22a, 22b which are vertically spaced apart from each other. The belt body 20a is bridged between the hook member 21 and the fixing bracket 22 by causing the upper end portion of the belt body 20a to be inserted through the lower slit 21c of the hook member 21 and then causing it to be sewn onto one surface of the belt body 20a, and by causing the lower end portion of the belt body 20a to be inserted through the upper and lower slits 22a, 22b of the fixing bracket 22 and then causing it to be sewn onto the other surface of the belt body 20a.

A ring member 3 for supporting the retaining belt arrangement 2 is mounted on a top surface of the vertical wall r2 or the surface of the vehicle body floor F. The retaining belt arrangement 2 is arranged so as to extend along the vertical wall r2 of the recess portion R with the upper end portion of the belt body 20a thereof being inserted through the ring member 3.

Figure 3:
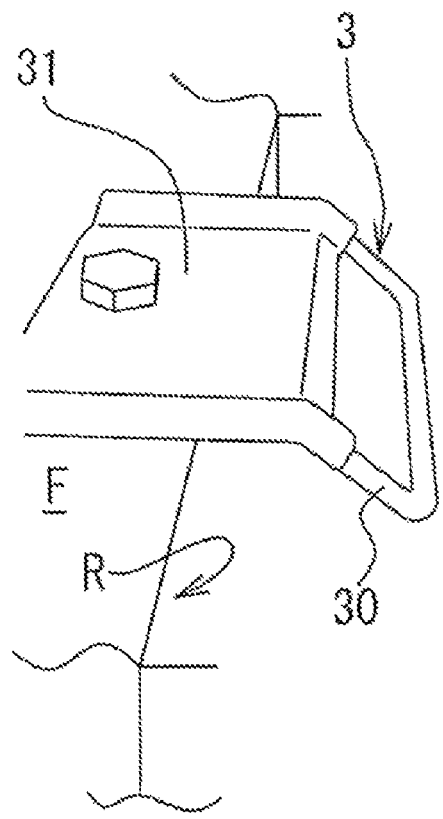
FIG. 3 is a perspective view of a ring member for supporting the retaining belt arrangement shown in FIG. 2.

The ring member 3 includes a base plate 31 and a substantially U-shaped ring portion 30 obliquely protruding downward from the base plate 31. As best shown in FIG. 3, the ring member 3 is mounted on the top surface of the vertical wall of the recess portion R with the base plate 31 being bolt-fastened onto the top surface of the vertical wall and with the substantially U-shaped ring portion 30 projecting into the recess portion R. At the time of none-use of the retaining belt arrangement 2, the hooking portion 21a of the hook member 21 is loosely hooked on the substantially U-shaped ring portion 30, whereby the retaining belt arrangement 2 is allowed to hang down from the ring member 3.

A spring 23 which has a length shorter than that of the belt body 20a is bridged between the upper end portion of the belt body 20a and the fixing bracket 22. The upper end portion of the belt body 20a which is inserted through the lower slit 21c of the hook member 21 is formed at a tip end region thereof with a through-hole 20b. The upper slit 22b of the fixing bracket 22 has a recess portion 22c. The spring 23 comprises a tension coil spring and is retained at an upper end portion thereof in the through-hole 20b of the belt body 20a and retained at a lower end portion thereof in the recess portion 22c of the fixing bracket 22. Incidentally, the lower end portion of the belt body 20a may be attached directly to the lower portion of the vertical wall r2 of the recess portion R, without the fixing bracket 22. In this case, the spring 23 is bridged between the upper and lower end portions of the belt body 20a.

The handle strap 24 is attached to the hook member 21 so as to extend upward from the hook member 21. The handle strap 24 includes a root portion 24a and a loop portion 24b. The root portion 24a of the handle strap 24 extends continuously from the loop portion 24b and is folded in two. More particularly, a part of the root portion 24a of the handle strap 24 is inserted through the upper and lower slits 21e, 21c of the hook member 21, turned back, inserted through the middle and upper slits 21d, 21e, and sewn to the loop portion 24b.

Figure 4:
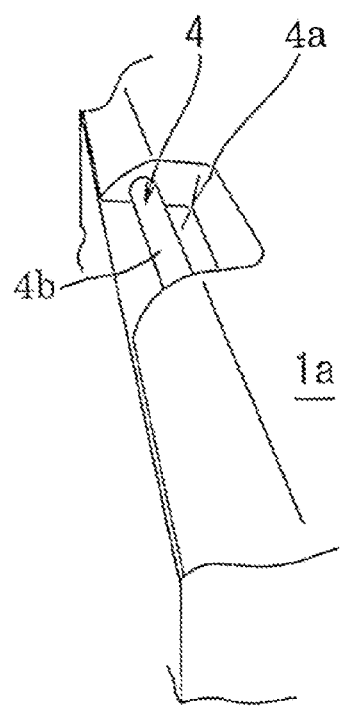
FIG. 4 is a perspective view showing an engagement means with which a hook member of the retaining belt arrangement is adapted to be engaged and which is provided at the seat cushion.

Referring now to FIG. 4, the seat cushion 1a is provided at the bottom portion thereof with an engagement means 4 with which the hooking portion of the hook member of the retaining belt arrangement is adapted to be engaged when the seat body is carried on the bottom surface of the recess portion R for storage. The engagement means 4 includes a recess portion 4a formed in a forward region of the bottom portion of the seat cushion 1a, the recess portion 4a having a width larger than that of the hooking portion 21a of the hook member 21, and a bar 4b bridged between both sides wall of the recess portion 4a. When the seat body is carried on the bottom surface of the recess portion, the hooking portion of the hook member is hooked on the bar 4b, whereby the seat body is retained on the bottom surface of the recess portion. In lieu of the engagement means 4 structured as discussed above, a recess portion which is formed into substantially a key-shape may be provided in the bottom portion of the seat cushion 1a. In this case, the hooking portion of the hook member is engaged in the recess portion formed into the substantially key-shape.

When the hooking portion 21a of the hook member 21 of the retaining belt arrangement 2 constructed as discussed above is to be hooked on the bar 4b of the engagement means 4 of the seat cushion 1a in the state where the seat body 1 is carried on the bottom surface r1 of the recess portion R, a person manually handles the loop portion 24b of the handle strap 24 so as to pull the belt body 20a up against the action of the spring 23 from the ring member 3, to thereby disengage the hooking portion 21a of the hook member 21 from the U-shaped ring portion 30 of the ring member 3. In this state, it is possible for the person to easily cause the hooking portion 21a of the hook member 21 to be hooked on the bar 4b of the engagement means 4. In the state where the hooking portion 21a of the hook member 21 is hooked on the bar 4b of the engagement means 4, it is also possible for the person to disengage the hooking portion 21a of the hook member 21 from the bar 4b of the engagement means 4 by handling the handle strap 24.

Figure 5:
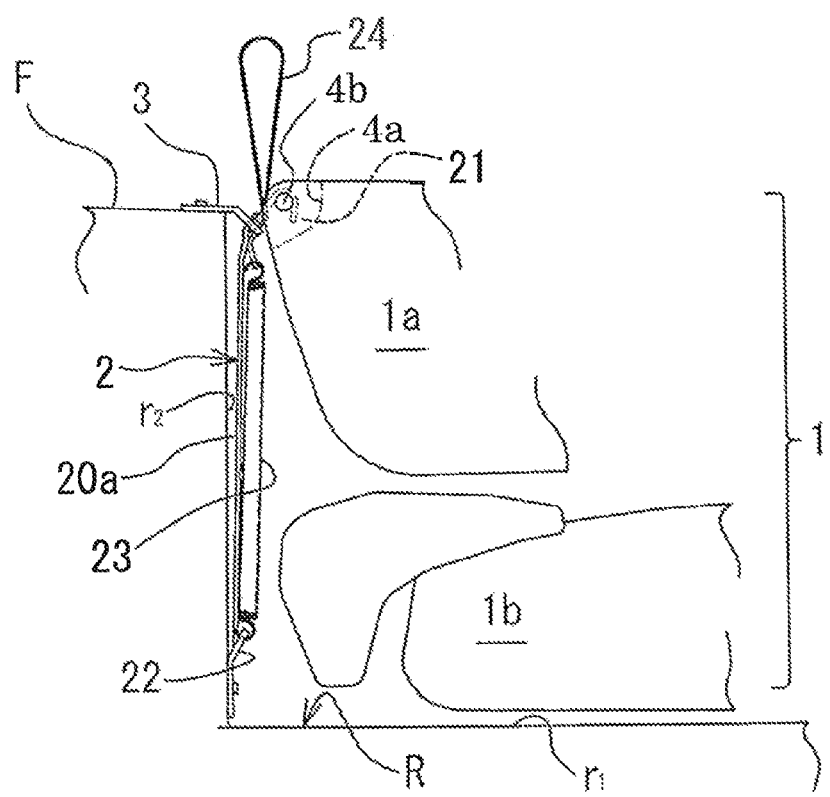
FIG. 5 is a view which is of assistance in explaining a state where the seat body is retained on the vehicle body floor by the retaining belt arrangement.
Figure 6:
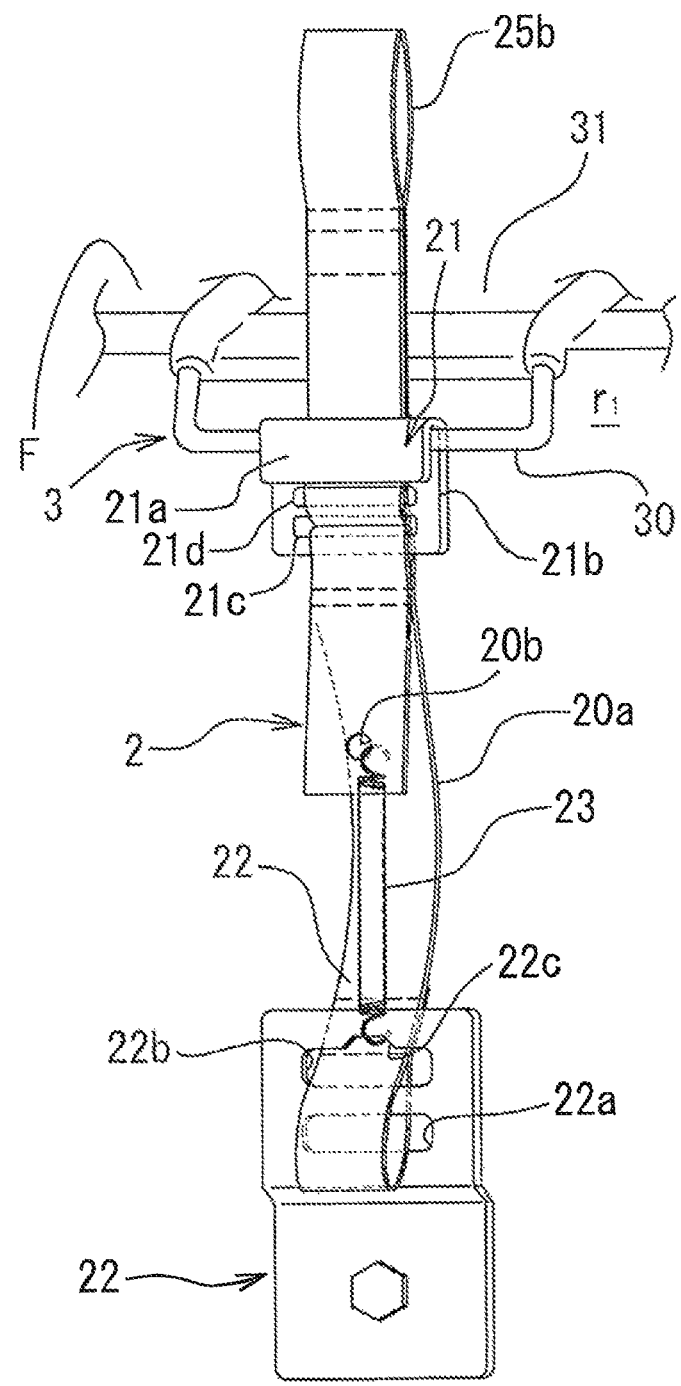
FIG. 6 is a perspective view which is of assistance in explaining a state where the hook member of the retaining belt arrangement is hooked on the ring member at the time of none-use of the retaining belt arrangement.

Referring to FIG. 5, there is illustrated the seat body 1 in the state of being stored within the recess portion R. In this state, the hooking portion of the hook member 21 is hooked on the bar 4b, whereby the seat body 1 is securely retained on the bottom surface r1 of the recess portion R by the retaining belt arrangement 2. Therefore, even if the vehicle is subjected to vibration during travel of the vehicle and the vibration is transmitted to the seat body 1, by the engagement between the hooking portion of the hook member of the retaining belt arrangement 2 and the bar 4b of the engagement means 4, both the seat cushion 1a and the seat back 1b are positively prevented from being jumped up according to the application of the vibration and, thus, any foreign sound are not produced. Moreover, deflection of the belt body 20a can be positively prevented by the ring member 3 and the spring 23.

Particularly, the seat body 1 into which the seat cushion 1a and the seat back 1b have been put together is securely retained, via the retaining belt arrangement 2, on the bottom surface r1 of the recess portion R from the front side in the direction in which the seat body 1 is pivoted for storage, so that the seat body 1 can be most stably retained on the bottom surface r1 of the recess portion R.

As discussed above, the retaining belt arrangement 2 includes the spring 23 which has the length shorter than that of the belt body 20a and is bridged between the tip end region of the upper end portion of the belt body 20a and the fixing bracket 22, so that, when the vehicle is subjected to the vibration during the travel of the vehicle and the vibration is transmitted to the seat body 1 in the stored state, the spring 23 allows the belt body 20a to be expanded and contracted, according to the application of the vibration. Therefore, the hooking portion 21a of the hook member 21 in use of the retaining belt arrangement 2 is positively prevented from being disengaged from the bar 4b.

As discussed above, the hooking portion 21a of the hook member 21 is hooked on the ring portion 30 of the ring member 3 at the time of none-use of the retaining belt arrangement 2, so that, at the time of none-use of the retaining belt arrangement 2, the retaining belt arrangement 2 can be arranged in such a manner that it extends along the vertical wall r2 of the recess portion R and hangs down from the ring member 3. In the state where the hooking portion 21a of the hook member 21 is hooked on the ring portion 30 of the ring member 3, the belt body 20a is flexed toward the vertical wall r2 of the recess portion R by the difference between the length of the spring 23 and the length of the belt body 20a, so that a length of the belt body 20a which is measured on a plane is shortened and, thus, the hook member 21 can be prevented from being disengaged from the ring portion 30 of the ring member 3 even if the hooking portion 21a of the hook member 21 is loosely hooked on the ring portion 30 of the ring member 3 as discussed above.

In the retaining belt arrangement 2, the hook member 21 is attached to the upper end portion of the belt body 20a, the upper end portion of the belt body 20a is inserted through the ring portion 30 of the ring member 3 mounted on the top surface of the vertical wall r2 of the recess portion R, and the fixing bracket 22 to which the lower end portion of the belt body 20a is attached is fixed to the lower portion of the vertical wall r2 of the recess portion R, so that accuracy of installation of the retaining belt arrangement is not required. Moreover, according to the invention, it is unnecessary to provide an obstacle such as the lock fitting (employed in the related art) on the surface of the vehicle body floor.

As discussed above, the engagement means 4 is provided at the bottom portion of the seat cushion 1a carried or overlapped on the seat back 1b and facing upward in the state where the seat body 1 has been stored within the recess portion R. The engagement means 4 may be provided at the front portion of the seat cushion 1 or side portion adjacent the front portion of the seat cushion 1a in the direction in which the seat body 1 is pivoted for storage, so that a degree of freedom in design is increased.

While the case where the seat body 1 into which the seat cushion 1a and the seat back 1b have been put together is pivoted rearward in such a manner that the seat cushion 1a is carried or overlapped on the seat back 1b and positioned in the upward position has been discussed above, the present invention may be applied to a case where the seat body 1 into which the seat cushion 1a and the seat back 1b have been put together is pivoted forward in such a manner that the seat back 1b is carried or overlapped on the seat cushion 1a and positioned in the upward position. Moreover, while the case where the seat body 1 is stored within the recess portion R has been discussed above, the present invention may be applied to a case where the vehicle body floor has an upper step portion and a lower step portion, the fixing bracket of the retaining belt arrangement is fixed to a body panel of the vehicle which extends upward from the lower step portion of vehicle body floor, the ring member is attached to the body panel, the seat cushion is pivotally supported on the upper step portion of the vehicle body floor, and the seat body into which the seat cushion and the seat back have been put together is pivoted rearward and then retained on the lower step portion of the vehicle body floor by the retaining belt arrangement.

The terms and expressions that have been employed herein are used as terms of description and not of limitation. There is no intention in the use of such terms and expression to exclude any equivalents of the features shown and described, or any portion thereof. It is recognized, however, that various modifications are possible within the scope of the invention claimed.

What is claimed is:

1. A folding vehicle seat adapted to be stored on a first portion of a vehicle body floor and retained on the portion of the vehicle body floor by a retaining belt arrangement, the folding vehicle seat comprising:
   a seat cushion pivotally supported on a second portion of the vehicle body floor; and
   a seat back pivotally supported by the seat cushion;
   the seat cushion and the seat back being adapted to be put together as a single seat body;
   the single seat body being adapted to be pivoted from the second portion of the vehicle body floor to the first portion of the vehicle body floor and then stored on the first portion of the vehicle body floor;
   the single seat body having an engagement means provided at one of the seat cushion and seat back which is positioned in an upward position when the single seat body is pivoted and stored on the first portion of the vehicle body floor;
   the vehicle body floor having a vertical wall extending upward from the first portion of the vehicle body floor and a ring member mounted on a top surface of the vertical wall for supporting the retaining belt arrangement; and
   the retaining belt arrangement comprising:
   a belt body attached at a lower end portion thereof to a lower portion of the vertical wall of the vehicle body floor; and
   a hook member having a hooking portion and attached to an upper end portion of the belt body with the hooking portion facing in the direction in which the seat body is pivoted for storage;
   the upper end portion of the belt body being inserted through the ring member; and
   the hooking portion of the hook member being engaged with the engagement means of the seat body in the stored state, whereby the vehicle seat is retained on the first portion of the vehicle body floor.

2. A folding vehicle seat according to claim 1, wherein the retaining belt arrangement is adapted to retain the seat body on the first portion of the vehicle body floor from a front side in the direction in which the seat body is pivoted for storage.

3. A folding vehicle seat according to claim 1 or 2, wherein the ring member includes a portion with which the hooking portion of the hook member is adapted to be engaged at the time of none-use of the retaining belt arrangement.

4. A folding vehicle seat according to claim 1, wherein the retaining belt arrangement includes a spring provided between the upper and lower end portions of the belt body, the spring having a length shorter than that of the belt body.

5. A folding vehicle seat according to claim 2, wherein the retaining belt arrangement includes a spring provided between the upper and lower end portions of the belt body, the spring having a length shorter than that of the belt body.

6. A folding vehicle seat according to claim 3, wherein the retaining belt arrangement includes a spring provided between the upper and lower end portions of the belt body, the spring having a length shorter than that of the belt body.

7. A folding vehicle seat according to claim 1, wherein the retaining belt arrangement includes a handle strap extending upward from the hook member.

8. A folding vehicle seat according to claim 2, wherein the retaining belt arrangement includes a handle strap extending upward from the hook member.

9. A folding vehicle seat according to claim 3, wherein the retaining belt arrangement includes a handle strap extending upward from the hook member.

10. A folding vehicle seat according to claim 4, wherein the retaining belt arrangement includes a handle strap extending upward from the hook member.

11. A folding vehicle seat according to claim 5, wherein the retaining belt arrangement includes a handle strap extending upward from the hook member.

12. A folding vehicle seat according to claim 6, wherein the retaining belt arrangement includes a handle strap extending upward from the hook member.

* * * * *